(12) United States Patent
Lee et al.

(10) Patent No.: US 8,713,408 B2
(45) Date of Patent: Apr. 29, 2014

(54) METHODS OF OPERATING NON-VOLATILE MEMORY DEVICES DURING WRITE OPERATION INTERRUPTION, NON-VOLATILE MEMORY DEVICES, MEMORIES AND ELECTRONIC SYSTEMS OPERATING THE SAME

(75) Inventors: Kwang Jin Lee, Hwaseong-si (KR); Yeong Taek Lee, Seoul (KR); Woo Yeong Cho, Suwon-si (KR); Hoi Ju Chung, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 227 days.

(21) Appl. No.: 13/193,191

(22) Filed: Jul. 28, 2011

(65) Prior Publication Data
US 2012/0311407 A1    Dec. 6, 2012

(30) Foreign Application Priority Data
May 30, 2011   (KR) ................. 10-2011-0051095

(51) Int. Cl.
*G11C 29/00*    (2006.01)

(52) U.S. Cl.
USPC .......................................... 714/768

(58) Field of Classification Search
USPC .......................................... 714/768
See application file for complete search history.

(56) References Cited

U.S. PATENT DOCUMENTS

| 6,553,532 | B1 | 4/2003 | Aoki |
| 2009/0150600 | A1 | 6/2009 | Suda |
| 2011/0289263 | A1* | 11/2011 | McWilliams et al. ........ 711/103 |

FOREIGN PATENT DOCUMENTS

| JP | 2000-112831 | 4/2000 |
| KR | 1020060090088 A | 8/2006 |
| KR | 1020090105760 A | 10/2009 |

OTHER PUBLICATIONS

JEDEC Standard, Low Power Double Data Rate 2 (LPDDR2), JESD209-2B (Revision of JESD209-2A, Oct. 2009), Feb. 2010.
JEDEC Standard, JESD209-2B, Feb. 2010, (4.7.9 Program/Erase Suspend; 4.7.10 Program/Erase Resume Command, Figures 16 &17), pp. 73-75.

* cited by examiner

*Primary Examiner* — Guy Lamarre
(74) *Attorney, Agent, or Firm* — Myers Bigel Sibley & Sajovec

(57) ABSTRACT

A non-volatile memory device may operate by writing a portion of a new codeword to an address in the device that stores an old codeword, as part of a write operation. An interruption of the write operation can be detected before completion, which indicates that the address stores the portion of the new codeword and a portion of the old codeword. The portion of the old codeword can be combined with the portion of the new codeword to provide an updated codeword. Error correction bits can be generated using the updated codeword and the error correction bits can be written to the address.

9 Claims, 16 Drawing Sheets

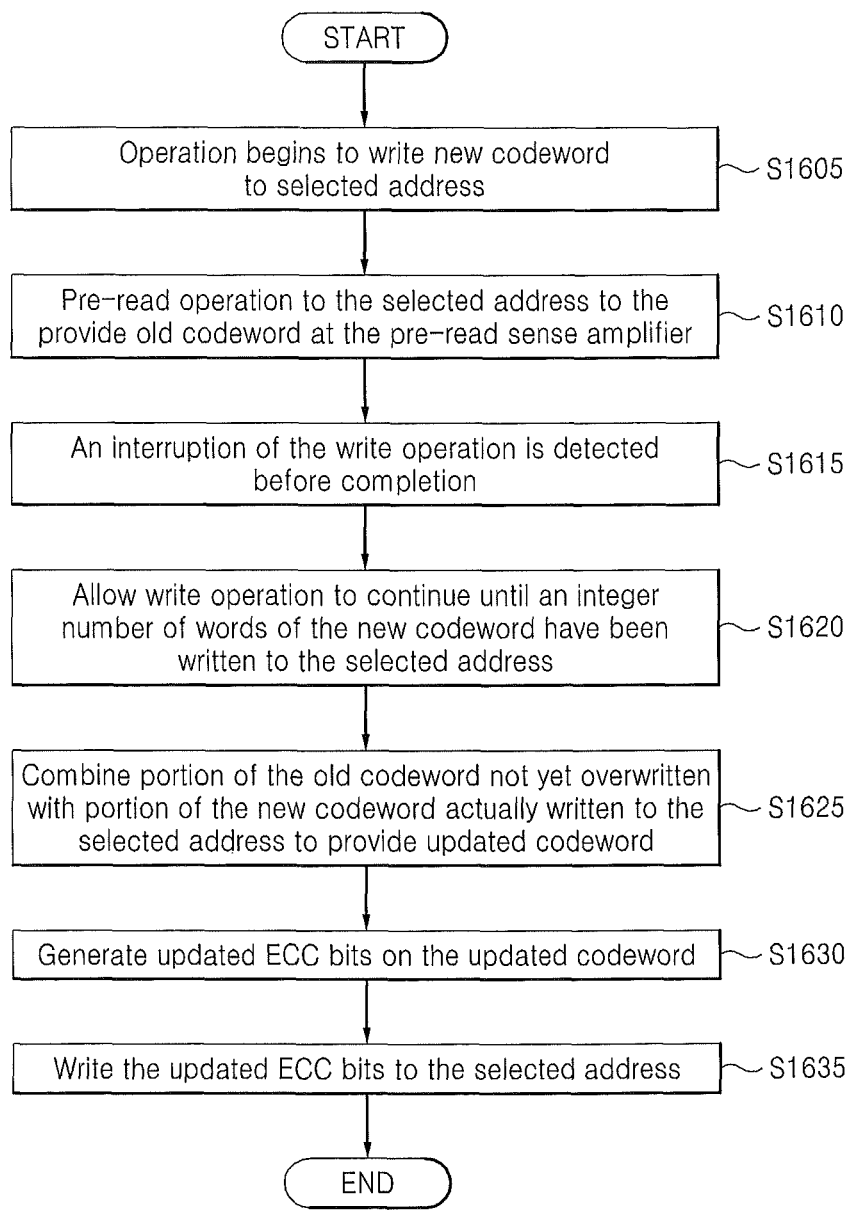

METHODS OF OPERATING NON-VOLATILE MEMORY DEVICES DURING WRITE OPERATION INTERRUPTION, NON-VOLATILE MEMORY DEVICES, MEMORIES AND ELECTRONIC SYSTEMS OPERATING THE SAME

CROSS-REFERENCE TO RELATED APPLICATIONS

This Application claims priority under 35 U.S.C. §119, to Korean Application No. 10-2011-0051095, filed in the Korean Intellectual Property Office on May 30, 2011, the entirety of which is incorporated herein by reference.

BACKGROUND

The inventive concept relates to the field of electronics in general, and more specifically, to non-volatile memories and operations thereof.

Some conventional non-volatile memory devices may not include an embedded Error Correction Code (ECC) encoder circuit. Other devices, which may include an ECC encoder circuit may not operate properly when power is abruptly removed from such devices.

SUMMARY

Embodiments according to the inventive concept can provide methods of operating non-volatile memory devices during write operation interruption. Pursuant to these embodiments, a non-volatile memory device may operate by writing a portion of a new codeword to an address in the device that stores an old codeword, as part of a write operation.

An interruption of the write operation can be detected before completion, which indicates that the address stores the portion of the new codeword and a portion of the old codeword. The portion of the old codeword can be combined with the portion of the new codeword to provide an updated codeword. Error correction bits can be generated using the updated codeword and the error correction bits can be written to the address.

In some embodiments according to the inventive concept, combining of the codewords can be provided by reading the old codeword from the address as part of a pre-read operation and combining the portion of the old codeword from the pre-read operation with the portion of the new codeword to provide the updated codeword. In some embodiments according to the inventive concept, combining the portion of the old codeword with the portion of the new codeword can be provided by concatenating the portion of the old codeword with the portion of the new codeword. In some embodiments according to the inventive concept, detecting interruption of the write operation before completion in the device can be provided by receiving, at the non-volatile memory device, a reset signal or a power down signal.

In some embodiments according to the inventive concept, writing the error correction bits to the address can be provided by writing the error correction bits to the address in response to detecting loss of power to the device. In some embodiments according to the inventive concept, the pre-read operation is performed responsive to the write operation before detecting interruption of the write operation to provide the portion of the old codeword to be combined with the portion of the updated codeword. In some embodiments according to the inventive concept, ones of the words in the old codeword can be selected to provide the portion of the old codeword in response to detecting the interruption. In some embodiments according to the inventive concept, detecting interruption of the write operation before completion in the device can be provided by allowing the write operation to continue until the portion of the new codeword at the address comprises an integer number of words that is less than an entire number of words in the new codeword.

In some embodiments according to the inventive concept, the non-volatile memory device can operate by writing a portion of a new codeword to an address that stores an old codeword, as part of a write operation. A portion of the old codeword can be combined with the portion of the new code word and then the error correction bits, generated using the portion of the old codeword and the portion of the new codeword, can be written in response to receipt of a signal indicating a loss of power to the device.

A method of operating a non-volatile memory device can be provided by writing a portion of a new codeword to an address that stores an old codeword, as part of a write operation in the device. A portion of the old codeword can be combined within the device with the portion of the new codeword. Error correction bits can be generated within the device using the portion of the old codeword and the portion of the new codeword and the error correction bits can be written to the address in response to an indication of loss of power to the device.

BRIEF DESCRIPTION OF THE DRAWINGS

FIG. 16 is a flowchart illustrating operations of the PRAM device illustrated in FIG. 1.

DESCRIPTION OF EMBODIMENTS ACCORDING TO THE INVENTIVE CONCEPT

Figure 1:
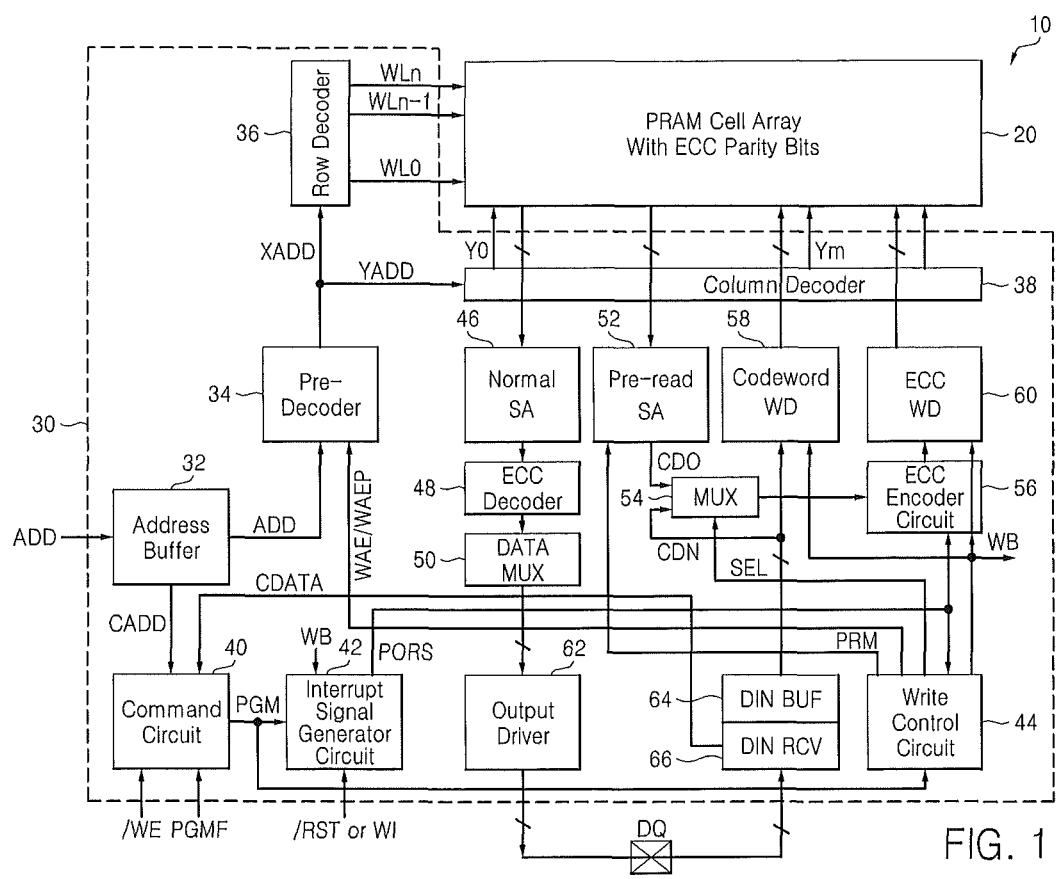
FIG. 1 is a block diagram of a Phase Changeable Random Access Memory (PRAM) device in some embodiments according to the inventive concept.

The inventive concept is described more fully hereinafter with reference to the accompanying drawings, in which embodiments of the inventive concept are shown by way of example. The inventive concept may, however, be embodied in many different forms and should not be construed as limited to the example embodiments set forth herein. Rather, these example embodiments are provided so that this disclosure will be thorough and complete, and will fully convey the scope of the inventive concept to those skilled in the art.

It will be understood that when an element is referred to as being "connected to," "coupled to" or "responsive to" (and/or variants thereof) another element, it can be directly connected, coupled or responsive to the other element or intervening elements may be present. In contrast, when an element is referred to as being "directly connected to," "directly coupled to" or "directly responsive to" (and/or variants thereof) another element, there are no intervening elements present. Like numbers refer to like elements throughout. As used herein, the term "and/or" includes any and all combinations of one or more of the associated listed items and may be abbreviated as "/".

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

The terminology used herein is for the purpose of describing particular embodiments only and is not intended to be limiting of the inventive concept. As used herein, the singular forms "a," "an" and "the" are intended to include the plural forms as well, unless the context clearly indicates otherwise. It will be further understood that the terms "comprises" and/or "comprising" (and/or variants thereof), when used in this specification, specify the presence of stated features, integers, steps, operations, elements, and/or components, but do not preclude the presence or addition of one or more other features, integers, steps, operations, elements, components, and/or groups thereof. In contrast, the term "consisting of" (and/or variants thereof) when used in this specification, specifies the stated number of features, integers, steps, operations, elements, and/or components, and precludes additional features, integers, steps, operations, elements, and/or components.

Unless otherwise defined, all terms (including technical and scientific terms) used herein have the same meaning as commonly understood by one of ordinary skill in the art to which the inventive concept belongs. It will be further understood that terms, such as those defined in commonly used dictionaries, should be interpreted as having a meaning that is consistent with their meaning in the context of the relevant art and the present application, and will not be interpreted in an idealized or overly formal sense unless expressly so defined herein.

It will be understood that "old" refers to a codeword that is stored in a memory and will be overwritten. "New" refers to a codeword which is received by the memory that is to be stored in the memory to overwrite an old codeword.

FIG. 1 shows a block diagram of a PRAM device 10 according to an example embodiment of the present inventive concept. Referring to FIG. 1, the PRAM device 10 includes a memory cell array 20 and an access circuit 30.

The PRAM device 10 includes the memory cell array 20 including a plurality of PRAM non-volatile memory cells. Although FIG. 1 illustrates a PRAM device or variable resistive memory embodiments according to the inventive concept may be embodied in any non-volatile memory device, such as an electrically erasable programmable read-only memory (EEPROM), a flash memory, a magnetic random access memory (MRAM), a spin-transfer torque MRAM, a conductive bridging RAM (CBRAM), a ferroelectric RAM (Fe-RAM), a phase change RAM (PRAM), a NOR flash-compatible PRAM, a resistive RAM (RRAM), a Nanotube RRAM, a polymer RAM (PoRAM), a nano floating gate memory (NFGM), a holographic memory, a molecular electronics memory device or an insulator resistance change memory. It will be understood that each of the non-volatile memory cells may store a single bit or multiple bits.

The memory cell array 20 may store codewords and associated Error Correction Code (ECC) bits to protect the data integrity of the codewords stored in memory.

Each codeword includes a plurality of words, and each of the plurality of words includes a plurality of bits. For example, the number of bits included in a word, i.e., a word size or a word length, can be 16, 32 or 64 according to an example embodiment, or 9, 12, 18, 24, 36, 39, 40, 48 or 60 according to another example embodiment. Accordingly, the word size may be defined based on a design specification or an example embodiment.

An access circuit 30 may access the array to perform an operation, such as a program operation (sometimes also referred to herein as a "write operation") or a read operation, on the memory cell array 20 according to a command input to the device 10, e.g., a command from a memory controller.

During a program operation, the access circuit 30 may receive a new codeword, generate ECC bits on the received new codeword, and program the new codeword and the ECC bits to a selected memory region in the memory cell array 20, which can be selected by row decoder circuit 36 and column decoder circuit 38.

During a read operation, the access circuit 30 can read an old codeword and (its associated ECC bits) from a selected memory region of the memory cell array 20 selected by the row decoder circuit 36 and column decoder circuit 38. It will be understood that the term "old codeword" refers to a codeword that has previously been programmed to the memory region in the array 20 along with associated ECC bits. During the read operation, the old codeword is checked for errors using the ECC bits, whereupon a determined number of bits in error may be repaired if within the limits of the error correction code used to protect the old codeword. For example, in some embodiments according to the inventive concept, with a single bit error correction/double bit error detection code, although any two errors in the old codeword may be detected, only old codeword with single bit errors error may be corrected. Other codes having more capability may be used.

According to a program command PGM, the access circuit 30 may detect an interrupt signal PORS that occurs while programming a new codeword to a memory region of the memory that already stores an old codeword and its associated ECC bits. Specifically, in some embodiments according to the inventive concept, only a portion of the new codeword is programmed into the memory region when the write operation is interrupted. Although the write operation is allowed to continue until an integer number of words of the new codeword are successfully written, no further words are written to the selected memory region. Accordingly, when writing of the new codeword ceases, the selected memory region stores two portions of different codewords: a portion of the new codeword that was programmed before the interruption and a portion of the old codeword that was not overwritten because the write operation ceased. The memory region also stores the ECC bits that correspond to the entire old codeword. Therefore, as appreciated by the present inventors, at the point described above, the memory region stores a corrupted codeword due to the interruption of the write operation because the ECC bits correspond only to the old codeword. Accordingly, the portion of the new codeword can be combined with the portion of the old codeword to provide an updated codeword. New ECC bits are generated on the updated codeword and the new ECC bits can be written to the memory region to protect the updated codeword stored at the memory region.

An address buffer 32 of the access circuit 30 may buffer input addresses ADD and transmit buffered addresses ADD to a pre-decoder 34 or transmit at least a portion of the address CADD to a command unit 40.

A pre-decoder 34 may decode input addresses ADD, codeword addresses WAE and an ECC address indication signal WAEP to provide a row address XADD and a column address YADD, to the row decoder 36 and the column decoder 38, respectively.

The row addresses XADD and the column addresses YADD may be used to select the address in the array 20 that is to be accessed (i.e. programmed or read). For example, the addresses can select the memory region to which a new codeword and ECC bits is to be written or the memory region of an old codeword and ECC bits that is to be read.

Codeword addresses WAE may be used as to indicate which among a plurality of words included in a codeword is being written or read. For example, when a codeword includes 16 words, codeword addresses WAE may include 4 bits. In addition, an ECC address indication signal WAEP indicates whether input addresses ADD are related to ECC bits.

The row decoder circuit 36 selects at least one of a plurality of word lines (WL0 to WLn, where n is a natural number) embodied in the memory cell array 20 according to row addresses XADD. The column decoder circuit 38 selects at least one of a plurality of bit lines (Y0 to Ym: where m is a natural number) embodied in the memory cell array 20 according to column addresses YADD.

The command circuit 40 may generate a program command PGM according to at least one of addresses CADD output from an address buffer 32, command data CDATA output from an input receiver 66 and a write enable signal /WE, and output the program command PGM to an interrupt signal generator circuit 42 and a write control circuit 44. The command circuit 40 may inactivate the program command PGM to a low level in response to a program completion signal PGMF output from the write control circuit 44.

Figure 2:
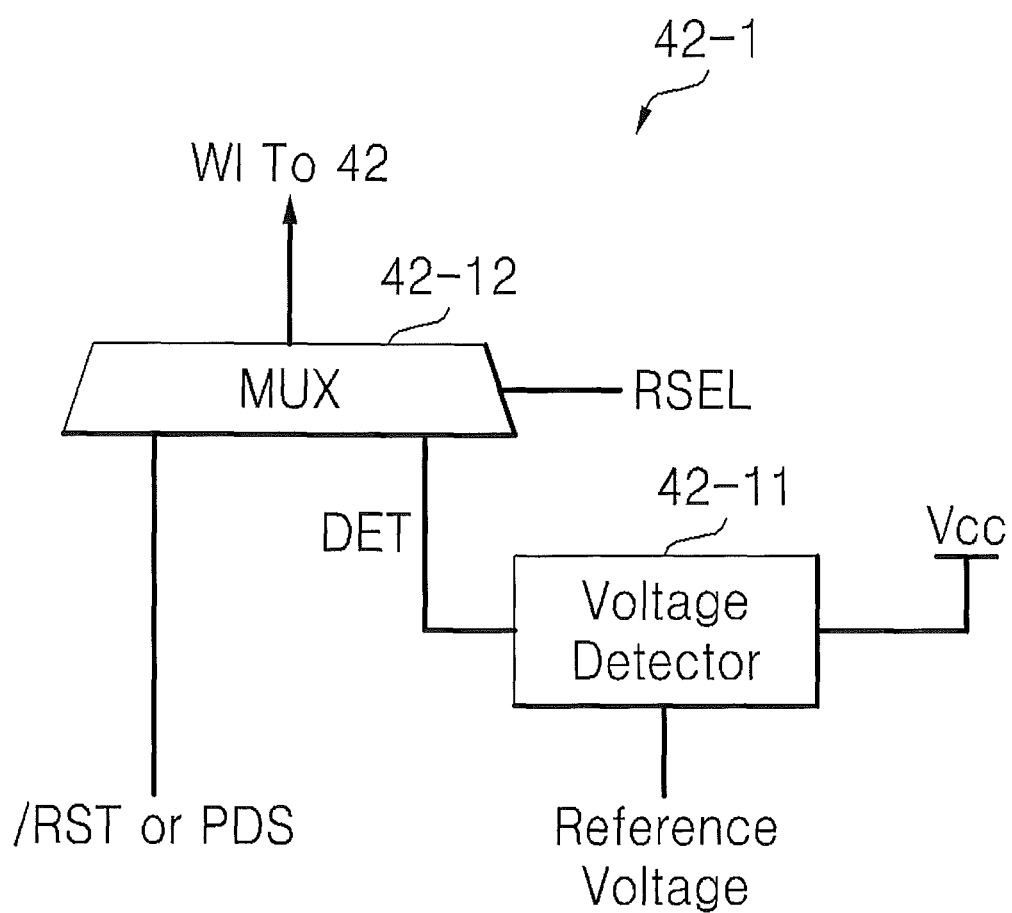
FIG. 2 is a schematic circuit diagram illustrating an operation control signal generation circuit of the PRAM device illustrated in FIG. 1.
Figure 3:
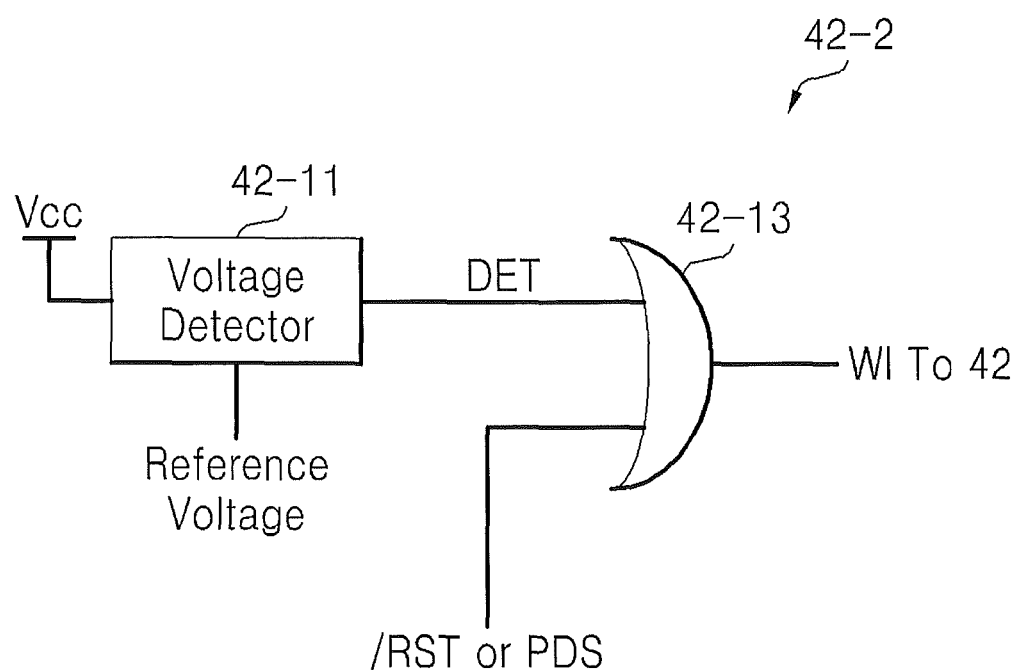
FIG. 3 is a schematic circuit diagram illustrating an operation control signal generation circuit of the PRAM device illustrated in FIG. 1.

The interrupt signal generator circuit 42 generates the interrupt signal PORS in response to the program command PGM, a write busy signal WB and an operation control signal/RST or WI, which can correspond to a RESET signal, a POWER DOWN, a power-off detection signal DET as illustrated, for example in FIGS. 2 and 3, which may be issued by a processor circuit.

The program command PGM indicates the start and end of a program operation, and the write busy signal WB controls operation of at least one of the interrupt signal generator circuit 42, an ECC encoder circuit 56, a codeword write driver circuit 58 and an ECC driver circuit 60 which are related to a program operation, which is also referred to as a write operation.

The power-down signal PDS can include any signal used to enable the PRAM device 10 to enter a power-down mode to reduce power consumption of the PRAM device 10 when an access operation, e.g., a program operation or a read operation, is not performed for a long time. For example, when the PRAM device 10 enters into a power-down mode or a deep power-down mode, the power-down signal PDS may be provided to the PRAM device 10. The circuits, logic, and/or code, used to generate the operation control signal /RST or WI, may be inside or outside the PRAM device 10.

During a program operation, a write control circuit 44 may control operation of the pre-decoder circuit 34, a pre-read sense amplifier 52, a multiplexer circuit 54, the ECC encoder circuit 56, the codeword write driver circuit 58 and the ECC write driver circuit 60.

A write control circuit 44 outputs a pre-read control signal PRM to the pre-read sense amplifier 52 according to a program command PGM. The pre-read sense amplifier 52 provides the old codeword stored and/or ECC bits stored at the selected memory region. Therefore, the old codeword that is stored at the selected memory region is available early in the write operation for combination with a portion of the new codeword that is written before an interruption of the write operation is detected. When the interruption is detected the portion of the old codeword available from the pre-read sense amplifier 52 can be combined with the portion of the new codeword that has already been written to provide an updated codeword. The updated codeword represents the same codeword that is actually stored at the selected memory region due to the write operation being interrupted.

The codeword write driver circuit 58 may program the new codeword CDN, output from the input buffer 64, to the selected memory region of the memory cell array 20 in response to the write busy signal WB. In operation, the codeword write driver circuit 58 may program a plurality of words included in a new codeword CDN, on a word-by-word, to the selected memory region of the memory cell array 20. For example, in an embodiment where a new codeword includes 4 words, each of the words can be written to the selected memory region a word at a time using the codeword addresses WAE to indicate which of words is being written at a particular time.

According to an example embodiment of the inventive concept, the access circuit 30 further includes an operation block. The access circuit 30, for example the operation block during a program operation may compare the old codeword CDO, which is provided via the pre-read sense amplifier 52, with the new codeword CDN, provided through the input buffer 64, word by word or bit by bit, and may perform a partial-program operation programming different bits according to a comparison result.

In some embodiments according to the inventive concept, the access circuit 30 further includes an operation block. For example during a program operation, the operation block may compare a codeword, which is generated by inverting the new codeword CDN input through the input buffer 64, to the old codeword CDO sensed provided via the pre-read sense amplifier 52, on a word-by-word or bit-by-bit basis, and may perform a partial-program operation to write only those bits or words in the new codeword which are new compared to the codeword already stored at the memory region.

The ECC write driver circuit 60 may program the ECC bits generated by the ECC encoder circuit 56 in the memory cell array 20 in response to the write busy signal WB.

The selection signal SEL output from the write control circuit 44, controls the multiplexer circuit 54 to output either the new codeword CDN (from the input buffer 64) or the old codeword CDO, provided by the pre-read sense amplifier 52. The output of the multiplexer circuit 54 is provided to the ECC encoder circuit 56. For example, the multiplexer circuit 54 may output a portion of the old codeword and a portion of the new codeword to provide an updated codeword (as a combination of the new and old codewords) to the ECC encoder circuit 56, which generates new ECC bits for the updated codeword.

During a normal program operation, the ECC encoder circuit 56 which may generate ECC bits using the new codeword CDN output from the multiplexer circuit 54, which are then provided to the ECC write driver circuit 60.

The ECC write driver circuit 60 may program the ECC bits output from the ECC encoder circuit 56 to the selected memory region in the memory cell array 20 according to the write busy signal WB. That is, the ECC bits generated from the new codeword are used to overwrite the ECC bits of the old codeword stored at the same memory region.

In some embodiments according to the inventive concept, a program (i.e., write) operation can be interrupted by, for example, the sudden loss of power to the device or the receipt of a signal that indicates that power will shortly be removed. The interruption can, therefore, cause the interrupt signal PORS to be generated during a write operation when only a portion of a new codeword has been has been written to a memory region, but before the entire new codeword and the corresponding updated ECC bits have been written. As appreciated by the present inventors, if unaddressed, the interruption may corrupt the codeword stored at the memory region (a combination of a portion of the new codeword and a portion of the old codeword) as the ECC bits correspond only to the old codeword. In other words, because words of the new codeword are written to the memory region as they are received, the interruption may occur before all of the words in the new codeword are stored. This means that, after the write is interrupted, the memory region stores some of the new codeword and some of the old codeword that was to be overwritten. Moreover, because the ECC bits are written after all of the words in the new codeword are written, the ECC bits may not correspond to the new codeword until the updated ECC bits are generated and stored. Therefore, the ECC bits stored at the memory region no longer correspond to the codeword stored at the memory region when the interruption occurs. If the memory region were to be subsequently read, a serious data error may occur.

For example, before an interrupt signal PORS occurs, a first code of the selection signal SEL causes the multiplexer circuit 54 to select at a new word included in the new codeword that is provided from the input buffer 64. The multiplexer circuit 54 outputs the new word to the ECC encoder circuit 56. The first code (or value) of the selection signal SEL is provided by the write control circuit 44.

However, after the interrupt signal PORS occurs, the write control circuit 44 changes the value of the selection signal SEL to a second code, which causes the multiplexer circuit 54 to select an old word included in the old codeword provided by the pre-read sense amplifier 52. The first and second codes may include one-bit or more. The multiplexer circuit 54 then outputs the old word provided by the pre-read sense amplifier 52 to the ECC encoder circuit 56. The multiplexer circuit 54 can operate responsive to the selection signal SEL during the write operation so that the ECC encoder circuit 56 may generate ECC bits using the combination of old words and new words, which can then be provided to the ECC bit write driver 60 for programming to the selected memory region so that the data integrity of the updated codeword at the selected memory region can be maintained.

During a read operation of the selected memory region, a sense amplifier 46 senses and amplifies an old codeword and ECC bits associated with the old codeword stored at the memory region in the memory cell array 10.

The ECC decoder circuit 48 performs error detection and correction on the old codeword provided by the sense amplifier 46 using the associated ECC bits. Assuming that any errors in the old codeword or ECC bits are correctable, the data MUX 50 transmits the data decoded by the ECC decoder circuit 48, i.e., error-corrected data, to the output driver 62. The output driver 62 transmits the data from the PRAM 10 via a plurality of data pins DQ.

A new codeword is input to the PRAM device 10 via the plurality of data pins DQ, and is transmitted to the input buffer 64 through the input receiver 66. The new codeword CDN output from the input buffer 64 is transmitted to the ECC encoder circuit 56 via the multiplexer circuit 54. The new codeword is then transmitted to the codeword write driver 58, which writes the new codeword and the generated ECC bits to the selected memory region.

For example, when the number of bits of the new codeword is X, where X is a natural number, the number of ECC bits generated by the ECC encoder circuit 56 can be $\log_2 X + 1$. That is, when the new codeword CDN includes 16 words and one word is 16 bits, ECC bits can be 9 bits.

FIG. 16 is a flowchart illustrating operations of the PRAM device illustrated in FIG. 1. A write operation begins to write a received new codeword to a selected memory region in the memory that stores an old codeword and associated ECC bits corresponding to the old codeword (Block 1605). A pre-read operation is carried out to the selected memory region during an early portion of the write operation so that the old codeword is available via the pre-read sense amplifier, for combination with the new codeword in the event that the write operation is interrupted (block 1610). The write operation proceeds by sequentially writing each of the words in the new codeword to the selected memory region so that, gradually, each of the words in the old codeword stored at the memory region is overwritten. As the words of the new codeword are written, the words are also transmitted through the multiplexer circuit to the ECC encoder circuit for gradual determination of the ECC bits that will be written to the memory region once all of the words in the new codeword are written.

When an interruption of the write operation is detected before the write operation is complete (block 1615), the write operation is allowed to proceed to the point where an integer number of words of the new codeword have been written to the selected memory region (block 1620). At this point, the data stored at the memory region is a portion of the new codeword and a portion of the old codeword along with ECC bits that correspond only to the old codeword. The multiplexer circuit is switched so that the words in the old codeword that were not overwritten during the interrupted write operation are transmitted to the ECC encoder circuit for combination with the words of the new codeword which were actually written to the memory region to provide an updated codeword (block 1625), which is the same as the codeword stored at the memory region. The combination of the words from the old and new codewords can be provided by concatenating the words with one another to provide the updated codeword having the same number of words as the new and old codewords. The ECC encoder circuit generates updated ECC bits using the updated codeword (block 1630). Once the updated ECC bits for the updated codeword are generated, the ECC driver writes the updated ECC bits to the memory region, thereby overwriting the old ECC bits which corresponded to the old codeword (block 1635).

FIG. 2 shows an embodiment of an operation control signal generation circuit of the PRAM device 10 illustrated in FIG. 1. Referring to FIGS. 1 and 2, an operation control signal generation circuit 42-1, which may be embodied selectively as a part of the access circuit 30, includes a voltage detector 42-11 and a selector 42-12.

During a program operation, the voltage detector 42-11 detects an operational voltage Vcc supplied to the PRAM device 10 or the access circuit 30, and generates a power-off detection signal DET when it is detected that the operating voltage Vcc is less than a reference voltage. For example, the voltage detector 42-11 may generate a power-off detection signal DET by detecting sudden removal of the operational voltage Vcc. In some embodiments according to the inventive concept, the operational voltage Vcc may be a power supply voltage for the device 10 or an internal voltage generated using Vcc.

The selector 42-12 may be a multiplexer circuit which outputs a reset signal /RST or a power-down signal PDS (or a power-off detection signal DET) to the interrupt signal generator circuit 42 as the operation control signal WI based on the state of the selection signal RSEL. For example, the selection signal RSEL may be generated using mode register set (MRS), a program memory or a fusing circuit. The fusing circuit can include a fuse which may be programmed or re-programmed in real-time.

FIG. 3 shows another example embodiment of the operation control signal generation circuit of the PRAM device 10 illustrated in FIG. 1. Referring to FIGS. 1 and 3, an operation control signal generation circuit 42-2, can be included in the access circuit 30, and can include a voltage detector 42-11 and an OR gate 42-13.

The OR gate 42-13 may perform a logical OR operation on the reset signal /RST (or the power-down signal PDS) and a power-off detection signal DET. The OR gate 42-13 outputs the result of the logical OR operation to the interrupt signal generator circuit 42 as the operation control signal WI. The reset signal /RST or the power-down signal PDS may be provided by a device that controls operations of the PRAM device 10 or a device supplying the operation voltage Vcc to the PRAM device 10.

Figure 4:
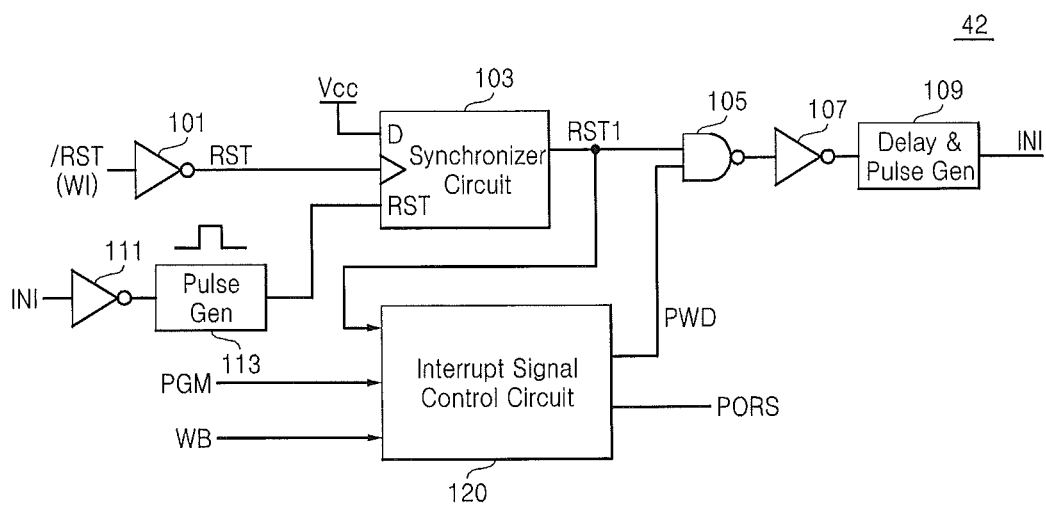
FIG. 4 is a schematic circuit diagram illustrating an interrupt signal generator circuit illustrated in FIG. 1.

FIG. 4 is a schematic circuit diagram of the interrupt signal generator circuit 42 illustrated in FIG. 1.

Referring to FIG. 1, a first inverter 101 of the interrupt signal generator circuit 42 inverts an operation control signal /RST or WI. A synchronizer circuit 103, e.g., a D-flip-flop, latches the operational voltage Vcc in response to a rising edge of an output signal RST of the first inverter 101 and outputs a latched signal RST1. For example, when the operational voltage Vcc is a logic high, i.e., a high level, the synchronizer circuit 103 latches the signal RST1 having a high level in response to the output signal RST from the first inverter 101.

A NAND gate 105 performs a logical NAND operation on the output signal RST1 of the synchronizer circuit 103 and a write completion signal PWD, and a second inverter 107 inverts the output signal of the NAND gate 105. A delay circuit 109 generates a pulse-type initialization signal INI having a particular pulse width after delaying the output signal of the second inverter 107 for a predetermined time. The delay circuit 109 may be a pulse generator circuit that operates the same as a pulse generator circuit 113. The PRAM device 10 may perform an internal reset operation in response to the initialization signal INI.

A third inverter 111 inverts the initialization signal INI. The pulse generator circuit 113 may reset the synchronizer circuit 103 to a low level in response to a rising edge of the signal output from the third inverter 111. The interrupt signal control circuit 120 generates the interrupt signal PORS and the write completion signal PWD according to combination of the program command PGM, the write busy signal WB and the output signal RST1 from the synchronizer circuit 103.

Figure 5:
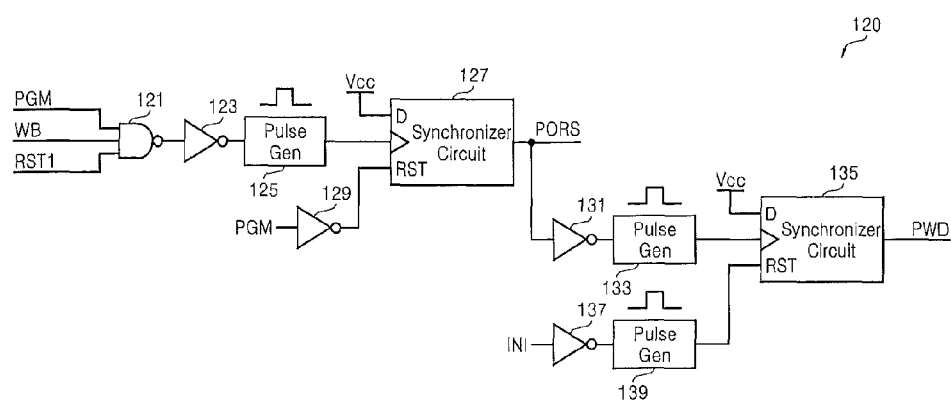
FIG. 5 is a schematic circuit diagram illustrating an interrupt signal control circuit illustrated in FIG. 4.

FIG. 3 is a schematic circuit diagram of the interrupt signal control circuit 120 illustrated in FIG. 4. Referring to FIGS. 4 and 5, a NAND gate 121 performs a logical NAND operation on the program command PGM, the write busy signal WB and the output signal RST1 from the synchronizer circuit 103, and a first inverter 123 inverts the output signal of the NAND gate 121. A first pulse generator circuit 125 generates a pulse signal having a particular pulse width in response to the output signal of the first inverter 123, e.g., a signal which transits from a low level to a high level.

A first synchronizer circuit 127, e.g., a D-flip-flop, latches an operational voltage Vcc, e.g., a data '1' corresponding to a high logic level, and outputs the interrupt signal PORS having a high level.

A second inverter 129 inverts the program command PGM. An output signal of the first synchronizer circuit 127 is reset to a low level in response to an output signal of a second inverter 129, e.g., a signal which transits from a low level to a high level. That is, when the program command PGM transits from a high level to a low level, the first synchronizer circuit 127 is reset to a low level.

A third inverter 131 inverts the interrupt signal PORS. A second pulse generator circuit 133 generates a pulse signal having a particular pulse width in response to an output signal of the third inverter 131, e.g., a signal which transits from a low level to a high level.

A second synchronizer circuit 135, e.g., a D-flip-flop, latches an operational voltage Vcc, e.g., a data '1' corresponding to a high logic level, in response to a rising edge of a pulse signal generated by the second pulse generator circuit 133 and outputs the write completion signal PWD having a high level.

A fourth inverter 137 inverts the initialization signal INI. A third pulse generator circuit 139 generates a pulse signal having a particular pulse width in response to an output signal of the fourth inverter 137, e.g., a signal which transits from a low level to a high level.

An output signal of the second synchronizer circuit 135 is reset to a low level in response to a rising edge of the pulse signal. That is, when the initialization signal INI transits from a high level to a low level, the second synchronizer circuit 135 is reset to a low level.

Figure 6:
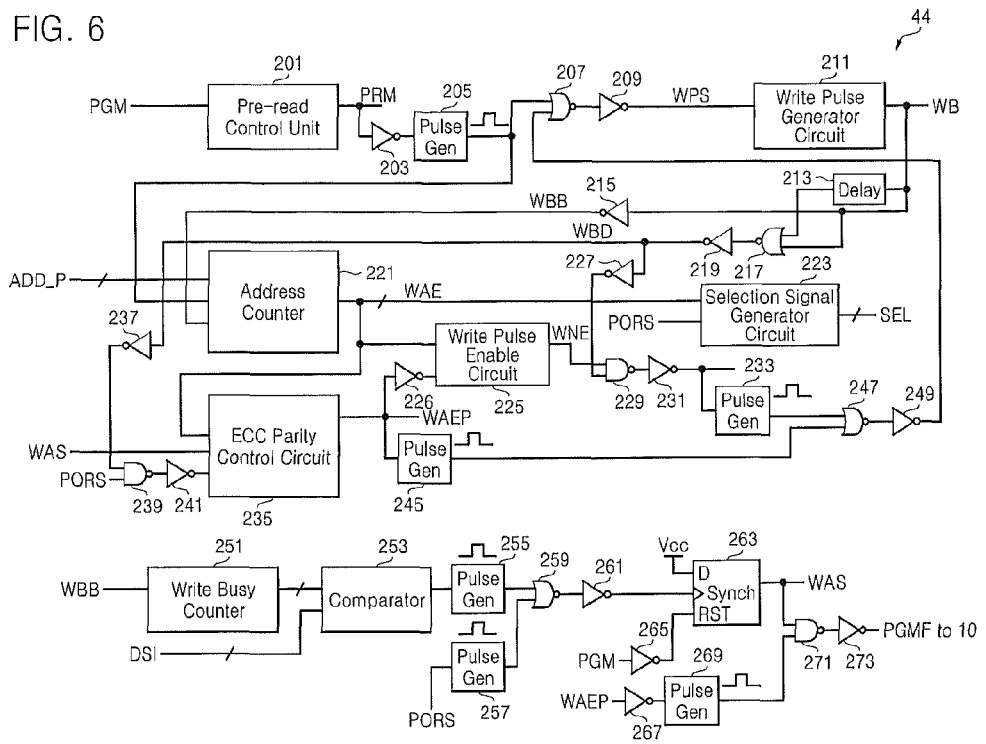
FIG. 6 is a schematic circuit diagram illustrating a write control circuit illustrated in FIG. 1.

FIG. 6 is a schematic circuit diagram of the write control circuit 44 illustrated in FIG. 1. Referring to FIGS. 1 and 6, a pre-read control circuit 201 generates a pre-read control signal PRM having a particular pulse width in response to the program command PGM. A first inverter 203 inverts the pre-read control signal PRM. A first pulse generator circuit 205 generates a pulse signal having a particular pulse width in response to a rising edge of an output signal of the first inverter 203.

A first NOR gate 207 performs a logical NOR operation on an output signal of the first pulse generator circuit 205 and an output signal of a tenth inverter 249, and a second inverter 209 generates a write pulse start signal WPS by inverting an output signal of the first NOR gate 207.

A write pulse generator circuit 211 generates a write busy signal WB having a particular pulse width in response to a rising edge of an output signal WPS of the second inverter 209. The write busy signal WB (e.g., a write pulse) controls operation of the codeword write driver 58 and the ECC write driver 60. A delay circuit 213 delays the write busy signal WB for a particular time and a third inverter 215 inverts the write busy signal WB. A second NOR gate 217 performs a logical NOR operation on an output signal of the delay circuit 213 and the write busy signal WB, fourth inverter 219 inverts an output signal of the second NOR gate 217, and a fifth inverter 237 inverts an output signal WBD of the fourth inverter 219.

An address counter 221 counts transitions of output signals WBB of the third inverter 215 and outputs count values WAE. For example, the count values WAE may be reset to a minimum value in response to transitions of output signals WBB of the third inverter 215 after the count values WAE reach a maximum value. The address counter 221 counts the number of transitions whenever an output signal WBB of the third inverter 215 transits from a high level to a low level, and generates count values increasing by 1 from a minimum value (or decreasing by 1 from a maximum value), i.e., codeword addresses WAE. Codeword addresses WAE may include a plurality of bits.

According to an example embodiment, an address counter 221, which is enabled in response to a pulse signal generated by the first pulse generator 205, may generate codeword addresses WAE increasing from a minimum value by 1 (or decreasing from a maximum value by −1) whenever the output signal WBB of the third inverter 215 transits from a high level to a low level.

According to another example embodiment, the address counter 221 may generate codeword addresses WAE increasing, by 1, from specific addresses, which is generated using at least part of addresses ADD_P output from an address buffer 32 shown in FIG. 1, whenever the output signal WBB of the third inverter 215 transits from a high level to a low level.

When an interrupt signal PORS is not generated, the selection signal generator circuit 223 generates the selection signal SEL having a first code in response to a codeword address WAE. Accordingly, the multiplexer circuit 54 outputs a new codeword CDN, provided by the input buffer 64, to the ECC encoder circuit 56 on a word-by-word basis.

However, when the interrupt signal PORS is generated, the selection signal generator 223 generates the selection signal SEL having a second code according to the interrupt signal PORS. For example, when the interrupt signal PORS occurs after codeword addresses WAE indicating a specific new word included in the new codeword CDN are generated, the selection signal generator circuit 223 generates the selection signal SEL having the second code after the specific word is transmitted completely to the ECC encoder circuit 56 by the multiplexer circuit 54 in response to the codeword addresses WAE and the interrupt signal PORS.

Accordingly, the multiplexer circuit 54 can output one of a plurality of words, included in an old codeword CDO output from the pre-read sense amplifier 52, to the ECC encoder circuit 56 on a word-by-word basis according to the selection signal SEL having the second code.

A write pulse enable circuit 225 generates a normal write enable signal WNE in response to codeword addresses WAE and an output signal of a seventh inverter 226. For example, since an ECC address indication signal WAEP is at a low level during a normal program operation, the write pulse enable circuit 225 may generate a normal write enable signal WNE having a high level until codeword addresses WAE on all of a plurality of words included in the new codeword CDN are generated.

For example, when 16 words are included in the new codeword CDN, the normal write enable signal WNE may retain in a high level until codeword addresses WAE becomes 1111 since codeword addresses WAE increase successively by 1 from a minimum value, i.e., 0000, to a maximum value, i.e., 1111.

An eighth inverter 227 inverts an output signal WBD of the fourth inverter 219, the second NAND gate 229 performs a logical NAND operation on an output signal of the eighth inverter 227 and the normal write enable signal WNE, and a ninth inverter 231 inverts an output signal of the second NAND gate 229.

A second pulse generator circuit 233 generates a pulse signal having a particular pulse width whenever an output signal of the ninth inverter 231 transits from a low level to a high level, and a third NOR gate 247 performs a logical NOR operation on an output signal of the second pulse generator 233 and an output signal of a third pulse generator 245, and a tenth inverter 249 inverts an output signal of the third NOR gate 247.

The third pulse generator 245 generates a pulse signal having a particular pulse width in response to an ECC address indication signal WAEP which transits from a low level to a high level.

During a normal program operation, whenever an output signal WBD of the fourth inverter 219 transits from a high level to a low level, a second pulse generator 233 generates a pulse signal having a particular pulse width according to operations of the eighth inverter 227, the second NAND gate 229 and the ninth inverter 231. Accordingly, whenever an output signal WBD of the fourth inverter 219 transits from a high level to a low level, the write pulse start signal WPS is generated by the second inverter 209.

A first NAND gate 239 performs a logical NAND operation on the interrupt signal PORS and an output signal of a fifth inverter 237, and a sixth inverter 241 inverts an output signal of the first NAND gate 239. An ECC control circuit 235 generates the ECC address indication signal WAEP in response to the codeword addresses WAE, a write address selection signal WAS and the output signal of the sixth inverter 241.

According to an example embodiment, during a normal program operation, the ECC control circuit 235 generates an ECC address indication signal WAEP having a high level after codeword addresses WAE indicating that the last word included in the new codeword CDN, are generated.

According to another example embodiment, during a normal program operation, the ECC control circuit 235 generates an ECC address indication signal WAEP having a high level according to the write address selection signal WAS having a high level. According to still another example embodiment, when the write busy signal WB is at a low level and the interrupt signal PORS occurs, the ECC control circuit 235 generates an ECC address indication signal WAEP having a high level. For example, during a write-suspend operation, the write busy signal WB may be at a low level.

A write busy counter 251 may output a count value in response to an output signal WBB of the third inverter 215, e.g., by counting the number of transitions whenever the output signal WBB of the third inverter 215 transits from a high level to a low level.

A comparator circuit 253 compares the value DSI (indicating a size of program data, such as the number of words in the new codeword CDN) with the count value and outputs a comparison signal. For example, when the value DSI is the same as the count value, the comparator circuit 253 outputs the comparison signal at a high level, and the comparator circuit 253 outputs the comparison signal at a low level in other cases.

The value DSI may be supplied from the command circuit 40, and information on the value DSI may be included in the command data CDATA. During a normal program operation, a fourth pulse generator circuit 255 generates a pulse signal having a particular pulse width according to a comparison signal having a high level. When the interrupt signal PORS occurs, a fifth pulse generator circuit 257 generates a pulse signal having a particular width according to the interrupt signal PORS having a high level.

A fourth NOR gate 259 performs a logical NOR operation on an output signal of the fourth pulse generator 255 and an output signal of the fifth pulse generator 257, and an eleventh inverter 261 inverts an output signal of the fourth NOR gate 259.

A synchronizer circuit 263, e.g., a D-flip-flop, outputs an operational voltage Vcc, e.g., a write address selection signal WAS latching a data '1' corresponding to a high level and having a high level, in response to an output signal of the eleventh inverter 261, e.g., an output signal which transits from a low level to a high level.

When the program command PGM transits from a high level to a low level, an output signal of the synchronizer circuit 263 is reset to a low level in response to an output signal of a twelfth inverter 265.

A thirteenth inverter 267 inverts the ECC address indication signal WAEP and a sixth pulse generator circuit 269 generates a pulse signal having a particular pulse width in response to an output signal of the thirteenth inverter 267, e.g., an output signal which transits from a low level to a high level.

A third NAND gate 271 performs a logical NAND operation on the write address selection signal WAS and an output signal of a sixth pulse generator circuit 269, and a fourteenth inverter 273 generates a program completion signal PGMF.

For convenience of explanation, pulse generator circuits having particular pulse widths in response to a signal which transits from a low level to a high level are shown in FIGS. 4 to 6, however, the pulse generator circuits may be replaced with pulse generator circuits having particular pulse widths in response to a signal which transits from a high level to a low level in some embodiments according to the inventive concept.

Figure 7:
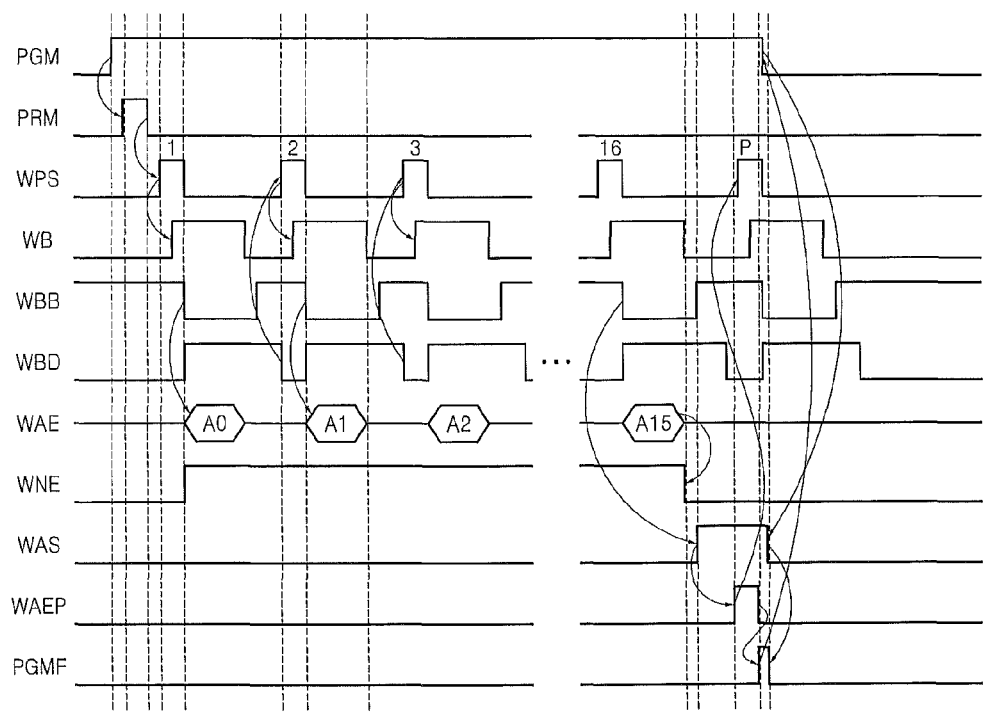
FIG. 7 is a timing diagram illustrating operations of the PRAM device illustrated in FIG. 1, without interruption of a write operation.

FIG. 7 is a timing diagram illustrating operations of the PRAM device 10 illustrated in FIG. 1, during a normal program operation.

In FIG. 7, it is assumed that the old codewords (the codewords stored in the array) and the new codeword both include 16 words, so that value DSI is 16, and the interrupt signal PORS does not occur while the old codeword stored at the selected memory region is overwritten with the new codeword one word at a time.

When the program command PGM is generated, the pre-read control circuit 201 generates the pulse-type pre-read control signal PRM having a particular pulse width. When the pre-read control signal PRM transits from a high level to a low level, the pulse generator circuit 205 generates a pulse signal having a particular pulse width in response to a rising edge of an output signal of a first inverter 203.

A first write pulse start signal WPS (=1) is generated according to an operation of each component 207 and 209, and a write pulse generator circuit 211 generates the first write busy signal WB in response to a rising edge of the first write pulse start signal WPS (=1).

The address counter 221 enabled according to a pulse signal generated by a first pulse generator circuit 205 generates codeword addresses WAE (=A0) indicating a first word of the new codeword in response to an output signal WBB of a third inverter 215, i.e., an output signal WBB which transits from a high level to a low level.

The write pulse enable circuit 225 generates the normal write enable signal WNE having a high level in response to an output signal of the seventh inverter 226 having a high level and codeword addresses WAE (=A0) indicating the first word.

The selection signal generator circuit 223 generates the selection signal SEL having a first code in response to codeword addresses WAE (=A0) and the interrupt signal PORS having a low level.

The multiplexer circuit 54 transmits the first word of the new codeword to the ECC encoder circuit 56 responsive to the selection signal SEL having the first code, whereupon the codeword write driver 58 programs the first word to the selected memory region in the memory cell array 20 according to a write busy signal WB having a high level. That is, the first word of the old codeword is overwritten with the first word of the new codeword. Therefore, at this point, the selected memory region includes one word of the new codeword and 15 words of the old codeword along with the ECC bits that were originally generated on the old codeword.

A pre-decoder circuit 34 decodes input addresses ADD, codeword addresses WAE (=A0) and an ECC address indication signal WAEP having a low level and generates addresses XADD and YADD. Accordingly, the memory region is determined by decoders circuits 36 and 38 according to addresses XADD and YADD.

The output signal WBD of the fourth inverter 219 transits from a high level to a low level and the second write pulse start signal WPS (=2) is generated by an operation of components 227, 229, 231, 233, 247, 249, 207 and 209. A write pulse generator circuit 211 generates the second write busy signal WB according to a rising edge of a second write pulse start signal WPS (=2).

The address counter 221 generates codeword addresses WAE (=A1) indicating a second word of the new codeword CDN in response to an output signal WBB of a third inverter 215, i.e., an output signal WBB which transits from a high level to a low level.

The write pulse enable circuit 225 generates a normal write enable signal WNE having a high level in response to an output signal of a seventh inverter 226 having a high level and codeword addresses WAE (=A1) indicating the second word of a current codeword CDN.

In response to codeword addresses WAE=A0 and an interrupt signal PORS having a low level, a selection signal generator circuit 223 generates the selection signal SEL having the first code, the multiplexer circuit 54 transmits the second word the new codeword CDN to the ECC encoder circuit 56, and the codeword write driver 58 programs the second word of the new codeword to the selected memory region in the memory cell array 20. That is, a second word of the old codeword is overwritten by the second word of the new codeword. Therefore, at this point, the selected memory region includes two words of the new codeword and 14 words of the old codeword along with the ECC bits that were originally generated on the old codeword.

A memory region where a second word of a new codeword CDN is programmed is determined by input addresses ADD, codeword addresses WAE (=A1) and an ECC address indication signal WAEP having a low level.

Similarly to the programming of the first and second words of the new codeword CDN described above, third to sixteenth words of the new codeword CDN are programmed a word at a time to the selected memory region. That is, the third to sixteenth words of the old codeword stored at the selected memory region have been overwritten by the third to sixteenth words of the new codeword.

After codeword addresses WAE=A15 indicating a sixteenth word of the new codeword are generated, the write pulse enable circuit 225 generates a normal write enable signal WNE having a low level.

The write busy counter 251 counts a falling edge of the write busy signal WB 16 times and outputs 16 as the count value. The comparator circuit 253 compares the value DSI indicating 16 to the count value indicating 16, and outputs the comparison signal having a high level.

According to an operation of each component 255, 259, 261 and 263, when the write address selection signal WAS having a high level is generated, the ECC control circuit 235 generates the ECC address indication signal WAEP having a high level in response to the write address selection signal WAS having a high level.

According to operations of components 245, 247, 249, 207 and 209, a seventeenth write pulse start signal WPS (=P) is generated. The write pulse generator circuit 211 generates a seventeenth write busy signal WB in response to a rising edge of a seventeenth write pulse start signal WPS (=P).

The ECC encoder circuit 56 generates ECC bits on the new codeword CDN that includes the 16 words that were provided via the multiplexer circuit 54 and transmits the generated ECC bits to the ECC bit write driver 60.

According to input addresses ADD and the ECC address indication signal WAEP having a high level, the pre-decoder circuit 34 generates addresses XADD and YADD to select the memory region in the memory region where the ECC bits generated by the ECC encoder circuit 56 will be stored.

The ECC bit write driver 60 programs the ECC bits generated by the ECC encoder circuit 56 at the selected memory region determined by addresses XADD and YADD. Accordingly, the ECC bits generated on the old codeword are overwritten with the ECC bits generated on the new codeword.

If an ECC address indication signal WAEP transits from a high level to a low level while a write address selection signal WAS retains a high level, a program completion signal PGMF is generated according to an operation of each components 267, 269, 271 and 273.

The command circuit 40 switches the program command PGM from a high level to a low level in response to a rising edge of the program completion signal PGMF. The write address selection signal WAS transitions to a low level according to an operation of each components 265 and 263, and the program completion signal PGMF transitions from a high level to a low level according to each of the components 271 and 273.

Figure 8:
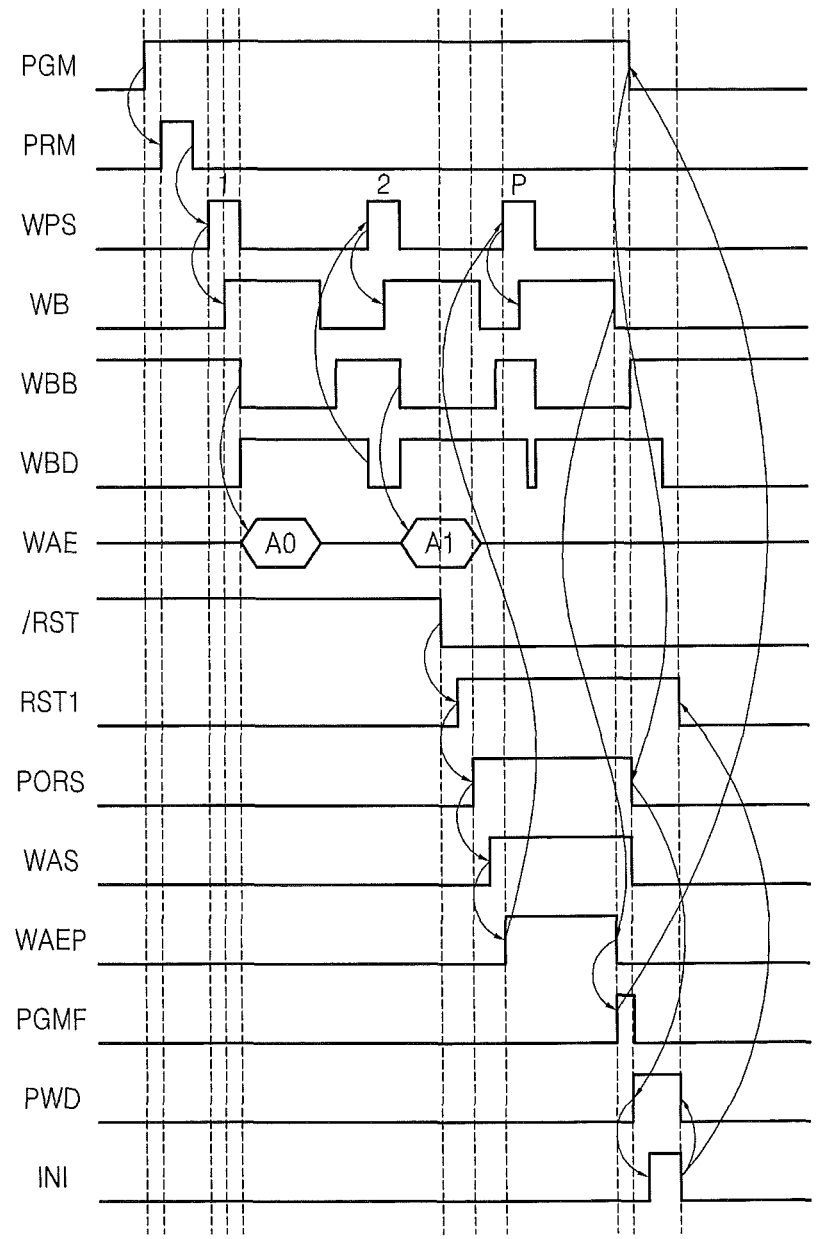
FIG. 8 is a timing diagram illustrating operations of the PRAM device illustrated in FIG. 1, when a write operation is interrupted.

FIG. 8 is a timing diagram illustrating operations of the PRAM device 10 illustrated in FIG. 1, when interruption of the write operation is detected, and FIG. 9 is block diagram illustrating operations of the PRAM device 10 of FIG. 1 to generate ECC bits when a write operation is interrupted.

Assuming that the old codeword CDO and the new codeword CDN each include 16 words, the words in the old codeword CDO are overwritten with the words of the new codeword, the value DSI is 16 and the interrupt signal PORS occurs during programming of the second word in the new codeword CDN, an operation of the PRAM device 10 may be explained referring to FIGS. 1, 4, 5, 6, 7 and 9 as follows.

When the program command PGM occurs, the pre-read control unit 201 generates a pulse type pre-read control signal PRM having a particular pulse width in response to the program command PGM.

When the pre-read control signal PRM transits from a high level to a low level, the pulse generator circuit 205 generates a pulse signal having a particular pulse width in response to an output signal of the first inverter 203 having a high level.

When a first write pulse start signal WPS (=1) is generated according to operation of components 207 and 209, the write pulse generator circuit 211 generates the first write busy signal WB in response to a rising edge of the first write pulse start signal WPS (=1).

The address counter 221 enabled according to a pulse signal generated from the pulse generator circuit 205 generates codeword addresses WAE (=A0) indicating a first word of the current codeword CDN in response to an output signal WBB of a third inverter 215, i.e., an output signal WBB which transits from a high level to a low level.

The write pulse enable circuit 225 generates the normal write enable signal WNE having a high level in response to an output signal of the seventh inverter 226 having a high level and codeword addresses WAE (=A0) indicating the first word of the new codeword CDN.

The selection signal generator circuit 223 generates the selection signal SEL having the first code, the multiplexer circuit 54 transmits the first word of the new codeword CDN to the ECC encoder circuit 56, and the codeword write driver 58 programs the first word of the new codeword CDN to the selected memory region in the memory cell array 20. That is, the first word of the old codeword at the selected memory region is overwritten with the first word of the new codeword.

The output signal WBD of a fourth inverter 219 transits from a high level to a low level and a second write pulse start signal WPS (=2) is generated according to operations of components 227, 229, 231, 233, 247, 249, 207 and 209. The write pulse generator circuit 211 generates a second write busy signal WB in response to a rising edge of the second write pulse start signal WPS (=2).

An address counter 221 generates codeword addresses WAE (=A1) indicating a second word of the current codeword CDN in response to the output signal WBB of a third inverter 215, i.e., an output signal WBB which transits from a high level to a low level.

Figure 9A:
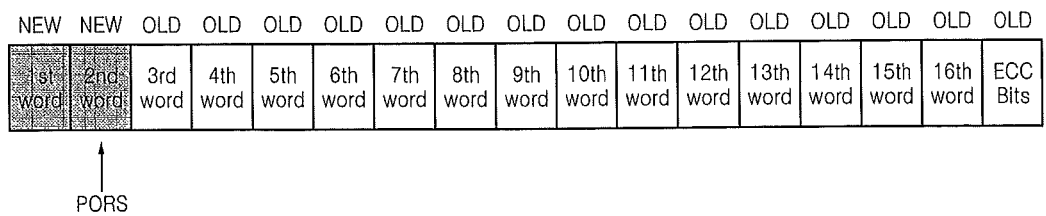
FIG. 9 is block diagram illustrating operations of the PRAM device of FIG. 1 to generate ECC bits when a write operation is interrupted.

As illustrated in FIG. 9A, when the interrupt signal occurs during programming of the second word of the new codeword CDN, the synchronizer circuit 103 latches the signal RST1 having a high level according to an output signal of the inverter 101 which transits from a low level to a high level.

The selection signal generator circuit 223 generates the selection signal SEL having the first code, the multiplexer circuit 54 transmits the second word of the new codeword CDN to the ECC encoder circuit 56, the codeword write driver 58 programs the second word of the new codeword CDN to the memory region selected according to input addresses ADD, codeword addresses WAE (=A1) and the ECC address indication signal WAEP having a low level.

Figure 9B:
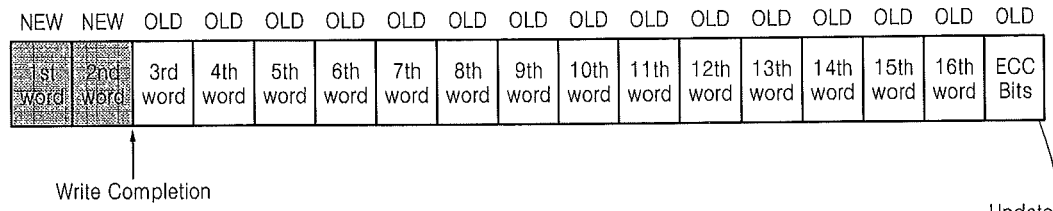

That is, the second word of the old codeword is overwritten with the second word of the new codeword CDN as illustrated in FIG. 9B.

The NAND gate 121 outputs a signal having a low level according to each signal PGM, WB and RST1 having a high level, and the inverter 123 inverts an output signal of the NAND gate 121. The pulse generator circuit 125 outputs a pulse signal having a particular pulse width according to an output signal of the inverter 123 which transits from a low level to a high level, and the synchronizer circuit 127 latches the interrupt signal PORS having a high level.

As the interrupt signal PORS having a high level is generated, the write address selection signal WAS transits from a low level to a high level and the selection signal generator circuit 223 generates the selection signal SEL having the second code.

According to the selection signal SEL having the second code, the multiplexer circuit 54 transmits the third to sixteenth words of the old codeword, provided by the pre-read sense amplifier 52, to the ECC encoder circuit 56 successively.

The ECC control circuit 235 generates the ECC address indication signal WAEP having a high level according to the write address selection signal WAS having a high level.

According to an example embodiment, the ECC address indication signal WAEP may be a signal having a particular pulse width. According to another example embodiment, the ECC address indication signal WAEP transited to a high level may transit to a low level according to the write busy signal WB transiting from a high level to a low level (FIG. 8).

The write pulse start signal WPS (=P) for programming the ECC bits according to operations of components 245, 247, 249, 207 and 209 is generated. The write pulse generator circuit 211 generates the write busy signal WB in response to a rising edge of the write pulse start signal WPS (=P).

The ECC encoder circuit 56 generates ECC bits using a combination of the first and second words of the new codeword CDN, with the third to sixteenth words of the old codeword CDO, i.e., a total of 16 words. According to another example embodiment, the ECC encoder circuit 56 may generate the new ECC bits regardless of whether the write busy signal WB occurs.

According to input addresses ADD and an ECC address indication signal WAEP having a high level, the pre-decoder circuit 34 may generate addresses XADD and YADD to select the memory region where new ECC bits generated by the ECC encoder circuit 56 will be programmed.

Figure 9C:
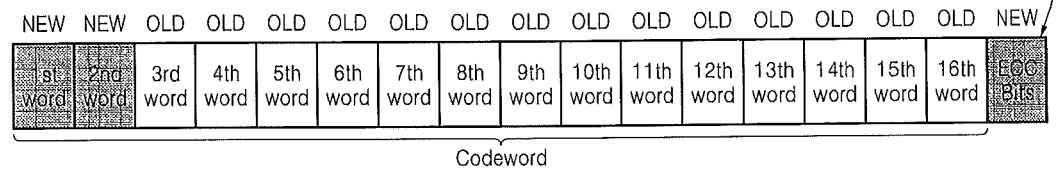

As illustrated in FIG. 9C, the ECC bit write driver 60 programs ECC bits, generated by the ECC encoder circuit 56, to the memory region designated by addresses XADD and YADD, according to the write busy signal WB having a high level. Accordingly, the ECC bits associated with the old codeword are overwritten with the newly generated ECC bits corresponding to the new codeword.

If the ECC address indication signal WAEP transits from a high level to a low level while a write address selection signal WAS retains in a high level, the program completion signal PGMF is generated according to operations of each of the components 267, 269, 271 and 273.

The command circuit 40 transitions the program command PGM from a high level to a low level in response to a rising edge of the program completion signal PGMF.

The synchronizer circuit 127 generates the interrupt signal PORS having a low level in response to an output signal of the inverter 129 transiting from a low level to a high level, and the inverter 131 inverts the interrupt signal PORS. Accordingly, the pulse generator circuit 133 generates a pulse signal having a particular pulse width, so that the synchronizer circuit 135 generates the write completion signal PWD having a high level.

When the initialization signal INI having a particular pulse width occurs according to operations of each of the components 105, 107 and 109 and the initialization signal NI transits from a high level to a low level, the synchronizer circuit 135 is reset to a low level according to operations of each of the components 137 and 139. At the same time, the synchronizer circuit 103 is reset to a low level according to operations of each of the components 111 and 113.

The PRAM device 10 performs an internal reset operation in response to the initialization signal INI.

FIG. 10 is block diagram illustrating operations of the PRAM device 10 of FIG. 1 to generate ECC bits when a write-suspend operation is interrupted after programming a second word of a new codeword in some embodiments according to the inventive concept.

Figure 10A:
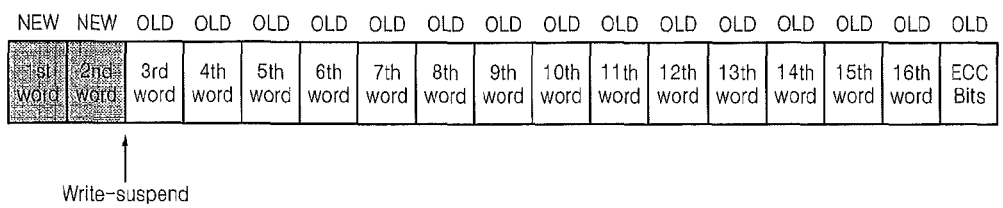
FIG. 10 is block diagram illustrating operations of the PRAM device of FIG. 1 to generate ECC bits when a write-suspend operation is interrupted.
Figure 10B:
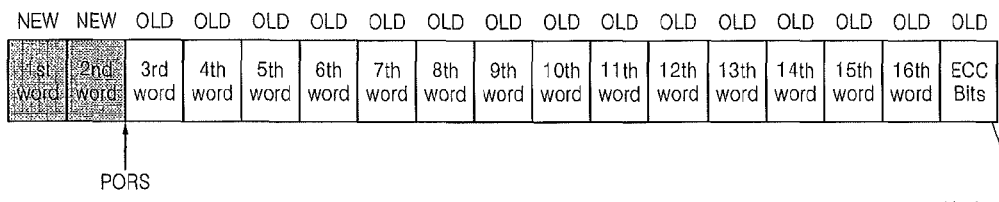
Figure 10C:
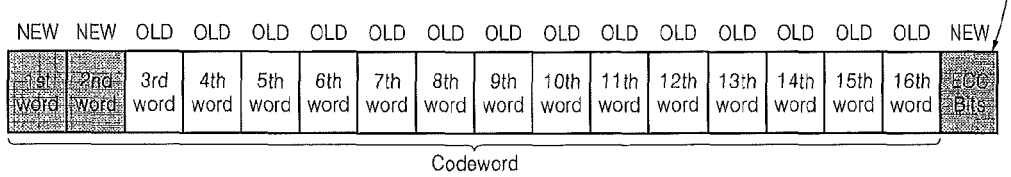

As illustrated in FIG. 10A to 10C, after programming a second word of a new codeword to a selected memory region in a memory cell array, the PRAM device 10 may generate new ECC bits using the first and a second words of the new codeword and third to sixteenth words of an old codeword stored at the selected memory region despite the interrupt signal PORS occurring.

Figure 11:
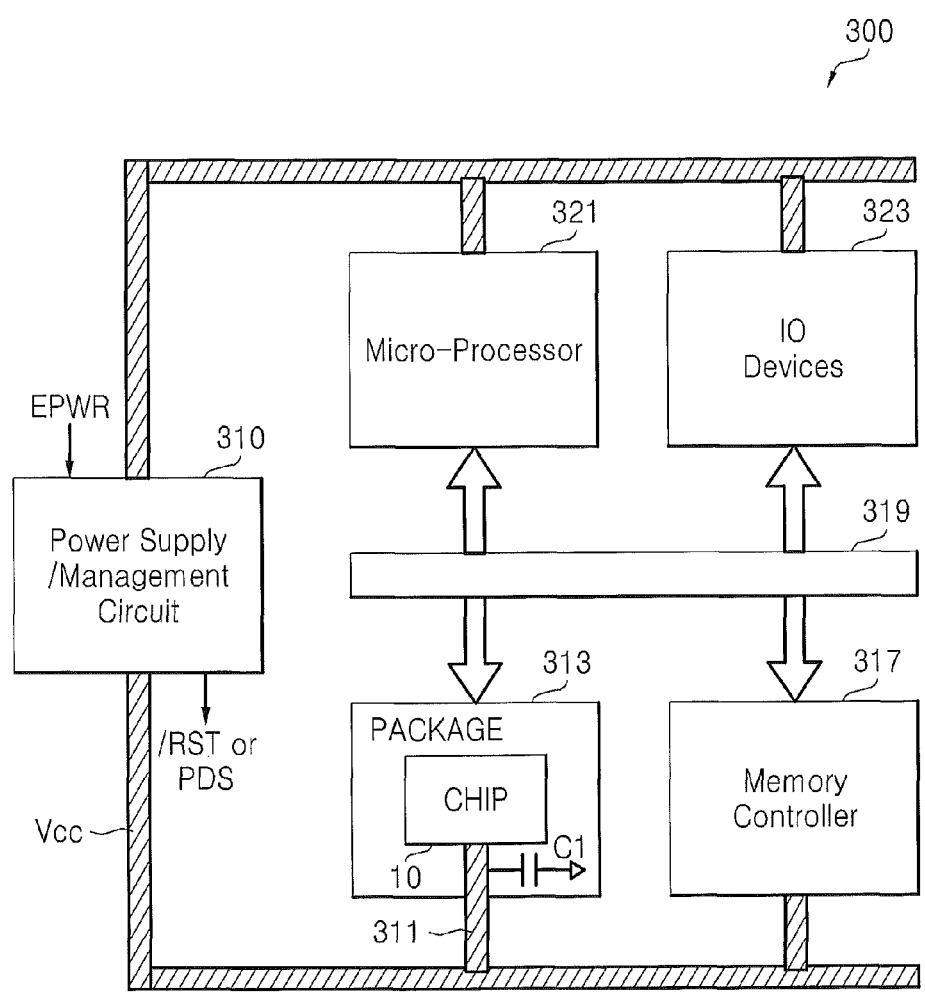
FIGS. 11-13 are block diagrams illustrating memory systems including the PRAM device of FIG. 1 and at least one capacitor.
Figure 12:
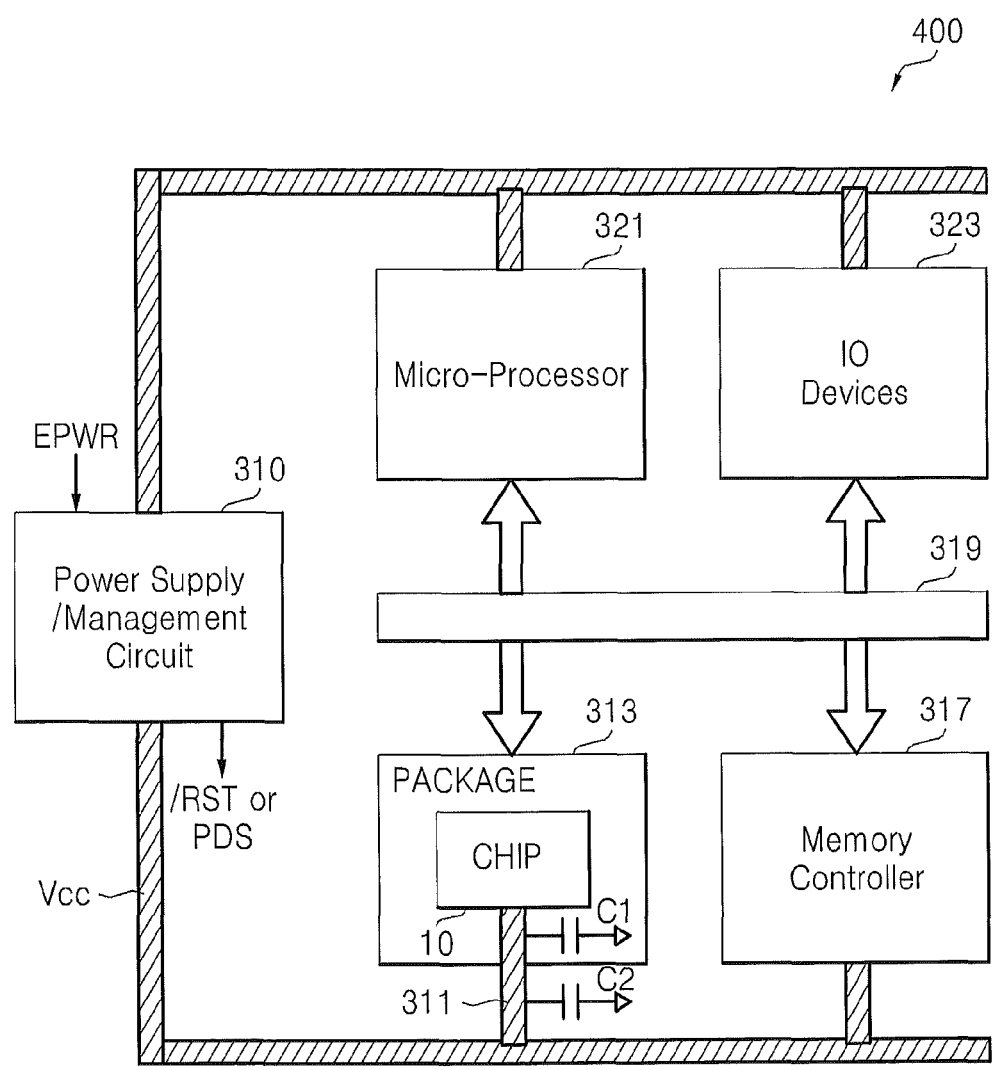
Figure 13:
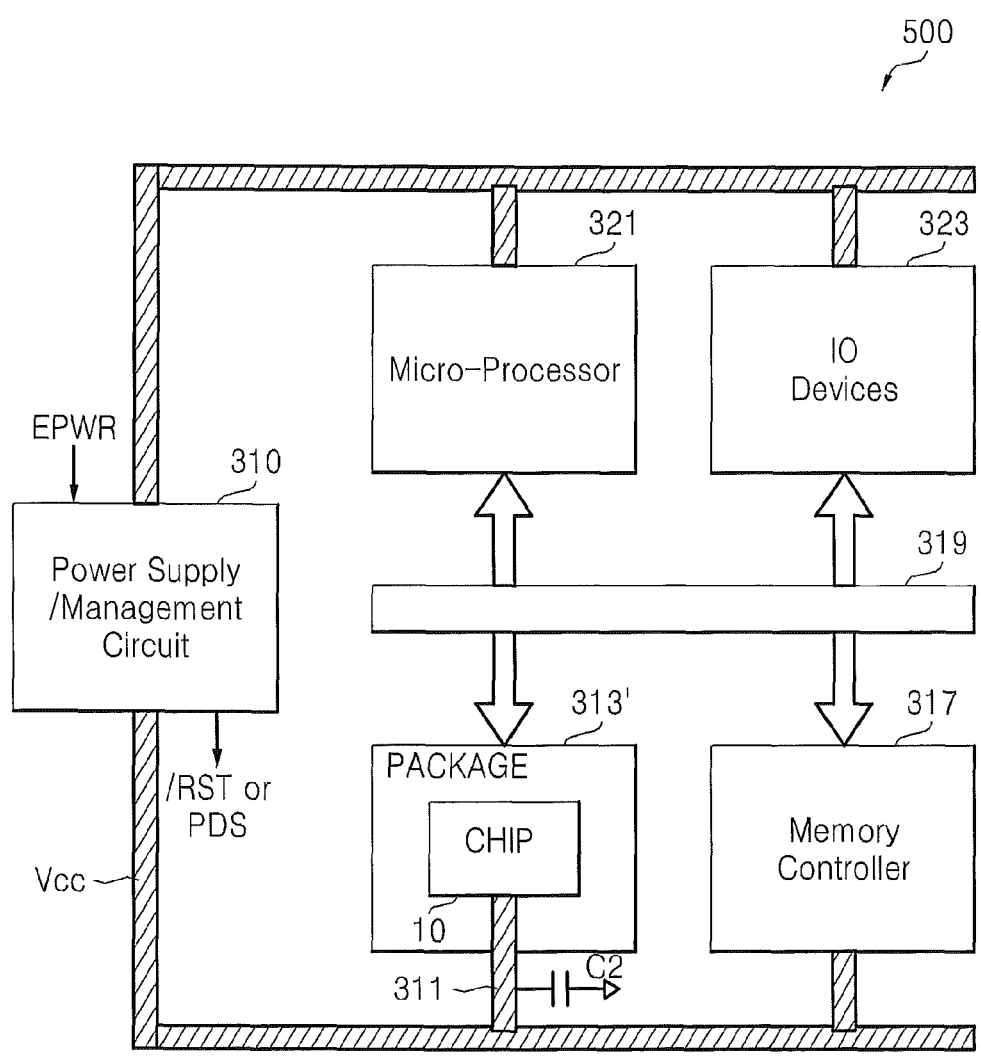

FIGS. 11-13 are block diagrams illustrating memory systems including PRAM devices of FIG. 1 and at least one capacitor.

Referring to FIG. 11, a memory system 300 includes an integrated circuit package 313 including the PRAM device 10 and a power management/power supply circuit 310.

An integrated circuit package 313 may be a Package On Package (PoP), a Ball Grid Array (BGA), μBGA, a Wire Bonding BGA (WBGA), a Chip Scale Package (CSP), a Plastic Leaded Chip Carrier (PLCC), a Plastic Dual In-Line Package (PDIP), Die in Waffle Pack, Din in Wafer Form, Chip On Board (COB), CERamic Dual In-Line Package (CERDIP), Plastic Metric Quad Flat Pack (MQFP), Thin Quad FlatPack (TQFP), a Small-Outline integrated circuit (SOIC), a shrink small outline package (SSOP), a thin small outline (TSOP), a system in package (SIP), a multi chip package (MCP), a wafer-level fabricated package (WFP), a wafer-level processed stack package (WSP), or the like.

The power management unit 310 generates an operational voltage Vcc by using an external power EPWR and supplies an operation voltage Vcc to the non-volatile memory device 10 through a power line 311.

The integrated circuit package 313 includes an embedded capacitor C1 connected between a power line 311 that provides the operational voltage Vcc to the integrated circuit package 313 and ground (or a reference voltage).

According to an example embodiment according to the inventive concept, the power management/power supply circuit 310 may generate a reset signal/RST or a power down signal PDS. For example, the power management unit 310 may generate a rest signal/RST in response to a hardware reset signal or a software reset signal.

According to another example embodiment, the power management/power supply circuit 310 may generate a power down signal PDS under the direction of a microprocessor 321. According to still another example embodiment, the power management/power supply circuit 310 may detect an external power EPWR signal or conditions associated with the operational voltage Vcc, and generate a power off detection signal according in response. Here, the power off detection signal may be provided as a type of reset signal /RST.

In this case, the interrupt signal generator circuit 42 may generate the interrupt signal PORS in response to a reset signal /RST, a power down signal PDS or the power off detection signal, or any of the above conditions.

The capacitor C1 maintains the operational voltage for a relatively short time so that the PRAM device 10 may program a word included in the new codeword to the selected memory region, generate new ECC bits and program generated ECC bits to the selected memory region safely, despite the interrupt signal PORS occurring during the write operation and before the writing of the entire new codeword could be completed.

As further shown in FIG. 11, the operational voltage Vcc is also supplied to each of a memory controller 317, a micro processor 321 and an input/output device 323, however, the power management/power supply circuit 310 may supply different voltages that are suitable to each of the elements shown according to an example embodiment.

It will be understood that the PRAM device 10, the memory controller 317, the microprocessor 321 and the input/output devices 323 may communicate with each other through a bus 319.

The memory controller 317 may control operations of the PRAM device 10, e.g., programming operations or read operations, under a control of the microprocessor 321.

The microprocessor 321 may control operations of the power management/power supply circuit 310, the PRAM device 10, the memory controller 317 and the input/output devices 323. As described above, the microprocessor 321 may monitor operations of the PRAM device 10 and output results to the power management/power supply circuit 310.

The input/output devices 323 may be embodied in a pointing device such as a touch pad or a computer mouse, a keypad or a keyboard. Additionally, the input/output devices 323 may be embodied in a display or a speaker.

Referring to FIGS. 11 and 12, a memory system 400 includes a capacitor C2 external to the integrated circuit package 313 in addition to the capacitor C1 inside the integrated circuit package 313. The capacitor C2 is connected between the power line 311 and ground (or a reference voltage).

Each capacitor C1 or C2 supplies operational voltage so that the PRAM device 10 may complete writing a word included in the new codeword that is interrupted during the write operation, generate new ECC bits, and program generated ECC bits in the selected memory region of the memory cell array 10, despite the interrupt signal PORS occurring during the write operation on the new codeword.

According to FIG. 13, a memory system 500 includes a capacitor C2 external to the integrated circuit package 313. The capacitor C2 is connected between the power line 311 and ground (or a reference voltage). The capacitor C2 supplies the operational voltage so that the PRAM device 10 may complete writing a word included in the new codeword that is interrupted during the write operation, generate new ECC bits, and program generated ECC bits in the selected memory region, of the memory cell array 10, despite the interrupt signal PORS occurring during the write operation on the new codeword.

Each memory system 300, 400 or 500 may be embodied in a cellular phone or a mobile phone, a smart phone, a personal computer, a laptop computer, a tablet PC, a personal digital assistant (PDA), a portable multimedia player (PMP), a MP3 player, a navigation device, an IPTV, an e-book or a game console. Each memory system 300, 400 or 500 may be embodied in a system on chip (SoC). The SoC may be embedded in hand-held devices or consumer electronics (CE), including digital TV, IPTV, or printers.

Figure 14:
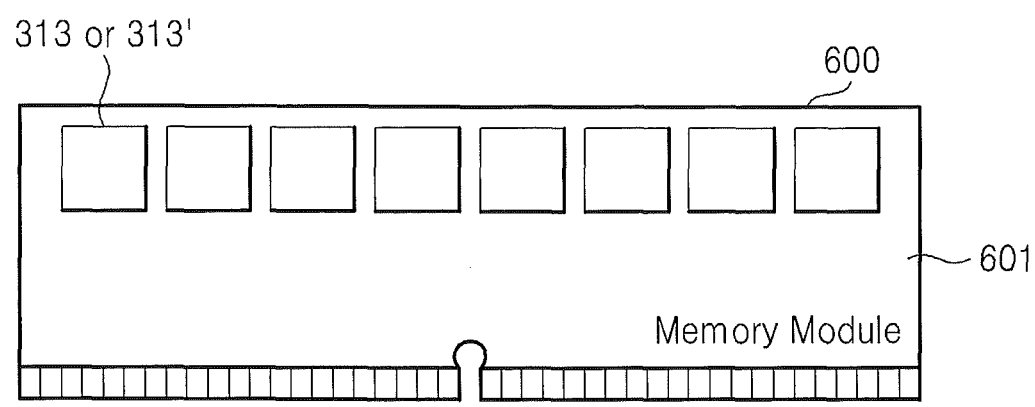
FIG. 14 is a schematic illustration of a memory module with an integrated circuit package including the PRAM device as illustrated in FIGS. 11-13.

FIG. 14 is a schematic illustration of a memory module 600 including the integrated circuit package 313/313' illustrated in FIGS. 11-13 in some embodiments according to the inventive concept. Referring to FIG. 14, the memory module 600 includes a plurality of packages 313 and 313' mounted on a board 601. When each of the plurality of packages 313' is embodied in a package illustrated in FIG. 13, for example, the capacitor C2 may be mounted on the board 601.

The memory module 600 may be a single in-line module (SIMM), a dual in-line memory module (DIMM), a registered dual in-line memory module (RDIMM), an unbuffered dual in-line memory module (UDIMM), a small outline dual in-line memory module (SO-DIMM) or an error check & correction small outline dual in-line memory module (ECC-SODIMM).

Figure 15:
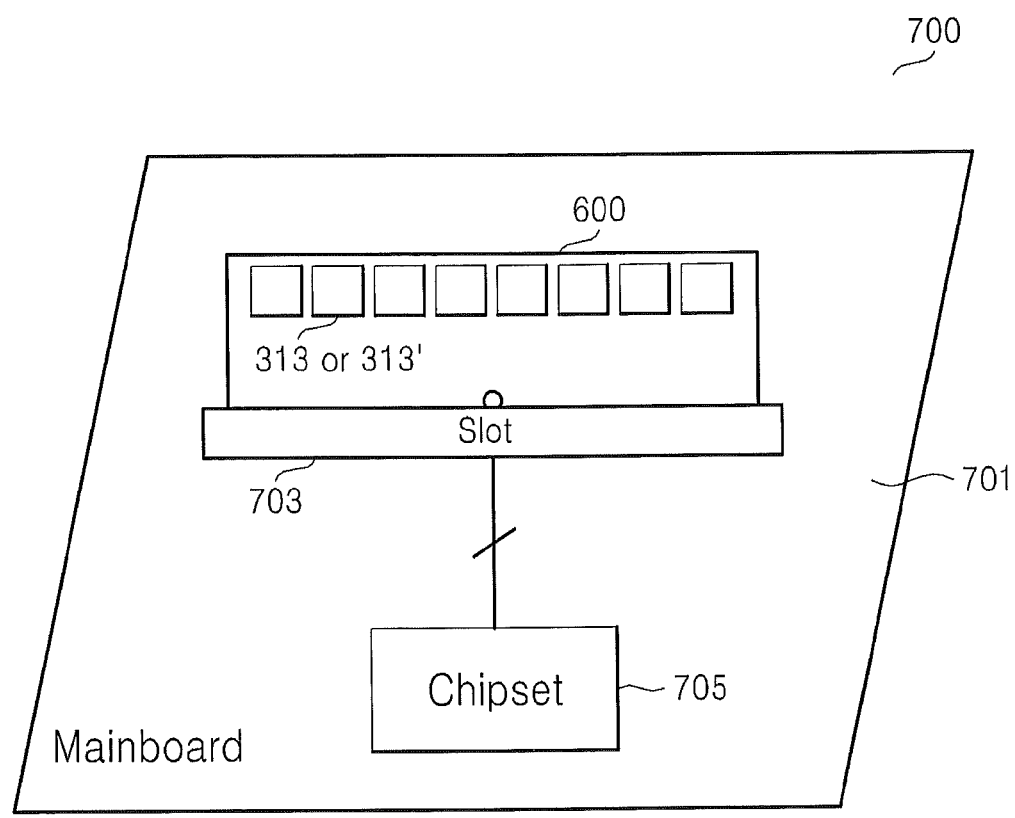
FIG. 15 is a schematic illustration of an electronic system with the memory module including the PRAM device as illustrated in FIG. 14.

FIG. 15 is a schematic illustration of an electronic system 700 including the memory module illustrated in FIG. 14. The electronic system 700, such as a personal computer (PC), a laptop computer and a storage server includes a main board 701, a slot 703 mounted on the main board 701, and a memory module 600 inserted in the slot 703.

The electronic system 700 is mounted on the main board 701 and includes a chip-set 705 controlling operations of the PRAM device 10 mounted on the memory module 600. The chipset 705 includes a processor.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of operating a non-volatile memory device comprising:
   writing a portion of a new codeword to a memory region in the device that stores an old codeword and old error correction bits corresponding to the old codeword, as part of a write operation;
   detecting interruption of the write operation before completion in the device, indicating that the memory region stores the portion of the new codeword that was written before the interruption and a portion of the old codeword that was not overwritten before the interruption;
   combining the portion of the old codeword with the portion of the new codeword to provide an updated codeword;
   generating updated error correction bits using the updated codeword; and
   writing the updated error correction bits to the memory region, thereby overwriting the old error correction bits.

2. The method of claim 1 wherein combining further comprises:
   reading the old codeword from the memory region as part of a pre-read operation; and
   combining the portion of the old codeword from the pre-read operation with the portion of the new codeword to provide the updated codeword.

3. The method according to claim 1 wherein combining the portion of the old codeword with the portion of the new codeword comprises:
   concatenating the portion of the old codeword with the portion of the new codeword.

4. The method according to claim 1 wherein detecting interruption of the write operation before completion in the device comprises:
   receiving, at the non-volatile memory device, a reset signal or a power down signal.

5. The method according to claim 1 wherein writing the error correction bits to the memory region comprises:
   writing the error correction bits to the memory region in response to detecting loss of power to the device.

6. The method according to claim 2 wherein the pre-read operation is performed responsive to the write operation before detecting interruption of the write operation to provide the portion of the old codeword to be combined with the portion of the updated codeword.

7. The method according to claim 6 further comprising:
selecting ones of words in the old codeword to provide the portion of the old codeword in response to detecting the interruption.

8. The method according to claim 1 wherein detecting interruption of the write operation before completion in the device comprises allowing the write operation to continue until the portion of the new codeword at the memory region comprises an integer number of words that is less than an entire number of words in the new codeword.

9. A method of operating a non-volatile memory device comprising:
writing a portion of a new codeword to a memory region in the device that stores an old codeword including a plurality of old error correction bits, as part of a write operation;

detecting interruption of the write operation before completion in the device, indicating that the memory region stores the portion of the new codeword that was written before the interruption and a portion of the old codeword that was not overwritten before the interruption, and further indicating that the memory region stores a corrupted codeword due to the interruption of the write operation wherein error correction bits correspond only to the old codeword;

combining the portion of the old codeword with the portion of the new codeword to provide an updated codeword;

generating a plurality of updated error correction bits using the updated codeword; and writing the updated error correction bits to the memory region.

* * * * *